United States Patent

Bakula

[11] Patent Number: 5,958,236
[45] Date of Patent: *Sep. 28, 1999

[54] UNDULATING SCREEN FOR VIBRATORY SCREENING MACHINE AND METHOD OF FABRICATION THEREOF

[75] Inventor: John J. Bakula, Grand Island, N.Y.

[73] Assignee: Derrick Manufacturing Corporation, Buffalo, N.Y.

[*] Notice: This patent is subject to a terminal disclaimer.

[21] Appl. No.: 08/955,342

[22] Filed: Oct. 21, 1997

Related U.S. Application Data

[63] Continuation-in-part of application No. 08/443,377, May 17, 1995, which is a continuation of application No. 08/273,217, Jul. 11, 1994, Pat. No. 5,419,859, which is a continuation-in-part of application No. 08/127,800, Sep. 28, 1993, abandoned, which is a continuation-in-part of application No. 08/062,464, May 14, 1993, Pat. No. 5,417,858, which is a continuation-in-part of application No. 08/004,122, Jan. 13, 1993, abandoned.

[51] Int. Cl.$^6$ .............................. B01D 33/03; B07B 1/46; B07B 1/49
[52] U.S. Cl. .................. 210/388; 210/493.1; 210/493.2; 210/493.3; 210/489; 210/490; 210/498; 210/499; 210/389; 209/397; 209/399; 209/401; 209/403; 209/329
[58] Field of Search ..................................... 210/388, 389, 210/493.1, 493.2, 493.3, 489, 490, 498, 499; 209/397, 399, 401, 403, 329

[56] References Cited

U.S. PATENT DOCUMENTS

| | | |
|---|---|---|
| 40,242 | 10/1863 | Capell . |
| 246,144 | 8/1881 | Keeler . |
| 275,340 | 4/1883 | Kimball . |
| 500,302 | 6/1893 | Stoeckel et al. .......................... 209/399 |
| 526,562 | 9/1894 | Cross ....................................... 209/397 |
| 560,858 | 5/1896 | Missroon ................................. 209/399 |
| 607,598 | 7/1898 | Closz . |
| 691,045 | 1/1902 | Climenson et al. ...................... 209/397 |
| 800,693 | 10/1905 | Traylor . |
| 964,144 | 7/1910 | Chavanne et al. ...................... 209/403 |
| 964,897 | 7/1910 | Bryant . |

(List continued on next page.)

FOREIGN PATENT DOCUMENTS

| | | |
|---|---|---|
| 505776 | 9/1951 | Belgium ................................ 209/403 |
| 599661 | 6/1960 | Canada . |
| 453348 | 10/1991 | European Pat. Off. ................ 209/397 |
| 3818972 | 2/1990 | Germany . |
| 55-32404 | 8/1980 | Japan . |
| 59-142818 | 8/1984 | Japan . |
| 1-203010 | 8/1989 | Japan . |
| 457924 | 12/1936 | United Kingdom .................... 209/403 |
| 519680 | 4/1940 | United Kingdom .................... 209/397 |
| 743902 | 1/1956 | United Kingdom .................... 209/403 |
| 823648 | 11/1959 | United Kingdom . |
| 1106513 | 3/1968 | United Kingdom . |
| 1225849 | 3/1971 | United Kingdom . |
| 1512958 | 6/1978 | United Kingdom . |
| 2124099 | 2/1984 | United Kingdom . |
| 89/10781 | 11/1989 | WIPO . |

*Primary Examiner*—Thomas M. Lithgow
*Attorney, Agent, or Firm*—Joseph P. Gastel

[57] ABSTRACT

A screening screen assembly for a vibratory screening machine including an apertured plate, and a subassembly of an undulating support screen and fine screening screen and finer screening screen bonded to each other by a fused plastic grid and bonded to the apertured plate. A method of fabricating a screening screen assembly for a vibratory screening machine including the steps of providing a support screen, superimposing a plastic grid onto the support screen, superimposing a finer screening screen onto the fine screening screen, applying heat and pressure to the superimposed screens to fuse the plastic grid and thereby form a flat bonded laminate subassembly by causing the fused plastic grid to permeate the fine screen and the finer screen and the support screen, forming the bonded laminate subassembly into an undulating shape, providing an apertured plate, and bonding the undulating bonded subassembly to the apertured plate. A screening screen assembly having ridges and troughs wherein the undersides of the troughs are secured to aligned plate members of the plate.

16 Claims, 11 Drawing Sheets

U.S. PATENT DOCUMENTS

| | | |
|---|---|---|
| 966,578 | 8/1910 | Murphy et al. . |
| 984,866 | 2/1911 | Tate . |
| 1,009,069 | 11/1911 | Hunnicutt . |
| 1,098,979 | 6/1914 | Schuchard . |
| 1,132,667 | 3/1915 | Milliot ................... 209/402 |
| 1,269,085 | 6/1918 | Jeske . |
| 1,423,021 | 7/1922 | Reynolds ................ 209/403 |
| 1,462,804 | 7/1923 | Evans ..................... 209/398 |
| 1,561,632 | 11/1925 | Woodward . |
| 1,947,307 | 2/1934 | Rafton .................... 209/401 |
| 1,997,713 | 4/1935 | Boehm .................... 209/401 |
| 1,997,740 | 4/1935 | Nickerson ............... 209/403 |
| 2,038,071 | 4/1936 | Wilhelm . |
| 2,082,513 | 6/1937 | Roberts ................... 209/401 |
| 2,089,548 | 8/1937 | Frantz . |
| 2,274,700 | 3/1942 | Jenks ...................... 209/401 |
| 2,315,055 | 3/1943 | Heller ..................... 209/400 |
| 2,406,051 | 8/1946 | Weiss . |
| 2,462,878 | 3/1949 | Logue . |
| 2,648,441 | 8/1953 | Soldan . |
| 2,723,032 | 11/1955 | Gisler ..................... 209/401 |
| 2,726,184 | 12/1955 | Cox . |
| 2,929,464 | 3/1960 | Sprouse . |
| 2,957,235 | 10/1960 | Steinberg . |
| 2,980,208 | 4/1961 | Neumann . |
| 3,057,481 | 10/1962 | Pall . |
| 3,165,473 | 1/1965 | Pall . |
| 3,255,885 | 6/1966 | Burls ...................... 209/397 |
| 3,306,794 | 2/1967 | Humbert, Jr. . |
| 3,374,886 | 3/1968 | Lightsey .................. 209/28 |
| 3,465,413 | 9/1969 | Rosaen et al. . |
| 3,664,503 | 5/1972 | Felden .................... 209/397 |
| 3,679,057 | 7/1972 | Perez . |
| 3,747,772 | 7/1973 | Brown .................... 210/493 |
| 3,853,529 | 12/1974 | Boothe et al. . |
| 3,970,549 | 7/1976 | Ennis et al. ............. 209/341 |
| 4,019,987 | 4/1977 | Krasnow ................. 210/232 |
| 4,022,596 | 5/1977 | Pedersen . |
| 4,033,865 | 7/1977 | Derrick ................... 209/275 |
| 4,064,051 | 12/1977 | Wehner . |
| 4,075,106 | 2/1978 | Yamazaki ............... 210/487 |
| 4,380,494 | 4/1983 | Wilson .................... 209/403 |
| 4,464,263 | 8/1984 | Brownell . |
| 4,512,892 | 4/1985 | Ganzi . |
| 4,517,090 | 5/1985 | Kersten . |
| 4,575,421 | 3/1986 | Derrick et al. .......... 209/397 |
| 4,582,597 | 4/1986 | Huber . |
| 4,594,162 | 6/1986 | Berger .................... 210/493.1 |
| 4,617,122 | 10/1986 | Kruse . |
| 4,647,373 | 3/1987 | Tokar et al. ............ 210/232 |
| 4,696,751 | 9/1987 | Eifling .................... 209/402 |
| 4,701,197 | 10/1987 | Thornton . |
| 4,746,339 | 5/1988 | Millard . |
| 4,758,333 | 7/1988 | Masica et al. .......... 209/397 |
| 4,820,407 | 4/1989 | Lilie ........................ 209/397 |
| 4,832,834 | 5/1989 | Baird, Jr. ................ 209/397 |
| 4,882,054 | 11/1989 | Derrick . |
| 4,940,500 | 7/1990 | Tadokoro et al. . |
| 4,954,249 | 9/1990 | Gero ....................... 209/399 |
| 5,084,178 | 1/1992 | Miller . |
| 5,139,154 | 8/1992 | Gero ....................... 209/397 |
| 5,167,740 | 12/1992 | Michaelis . |
| 5,221,008 | 6/1993 | Derrick, Jr. et al. .... 209/269 |
| 5,230,455 | 7/1993 | Price . |
| 5,312,508 | 5/1994 | Chisholm . |
| 5,417,859 | 5/1995 | Bakula .................... 210/388 |
| 5,490,598 | 2/1996 | Adams .................... 209/401 |
| 5,551,575 | 9/1996 | Leone ..................... 209/273 |
| 5,598,930 | 2/1997 | Leone et al. ............ 209/403 |

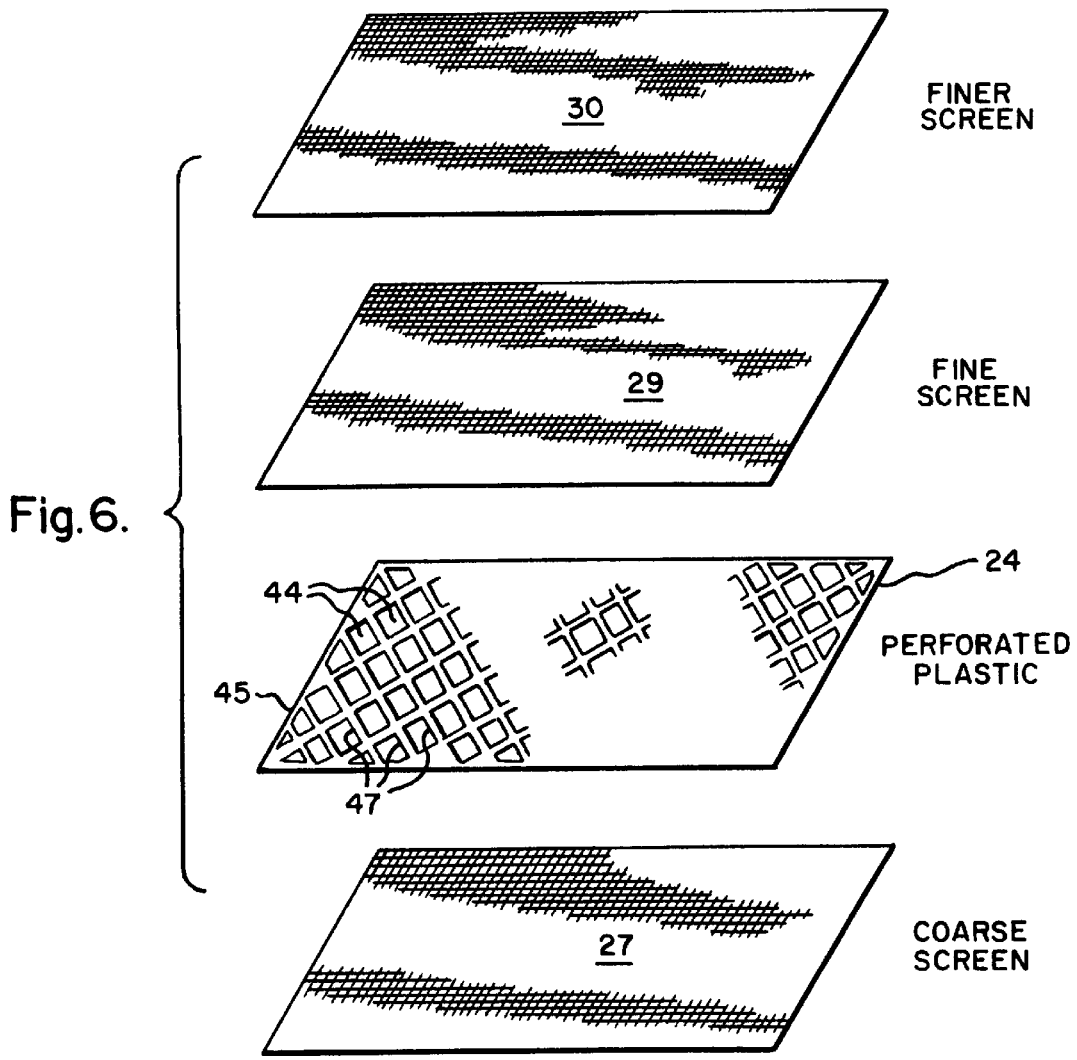
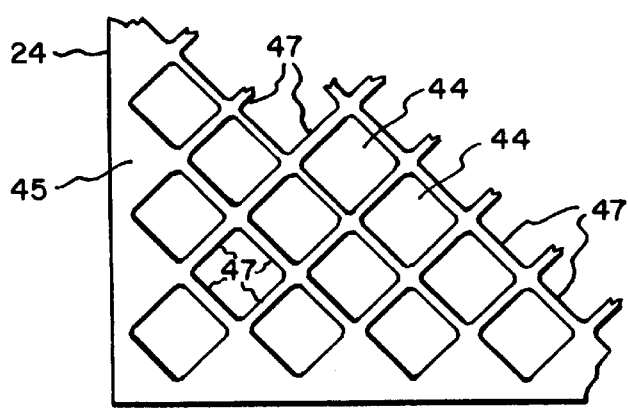

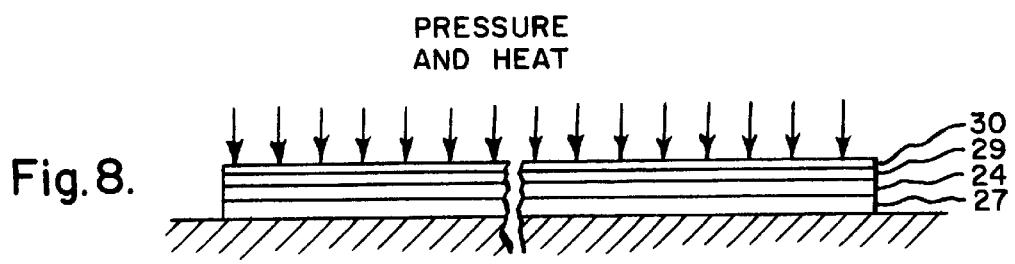
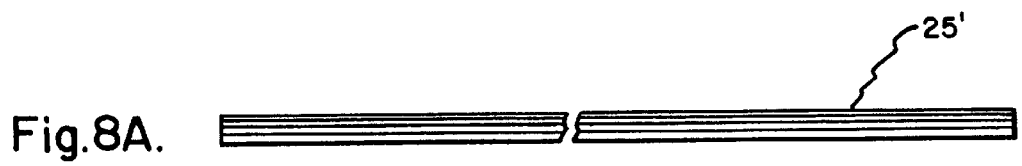
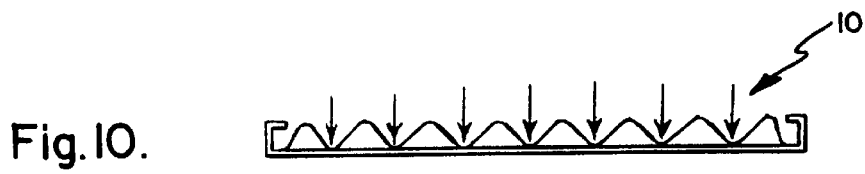
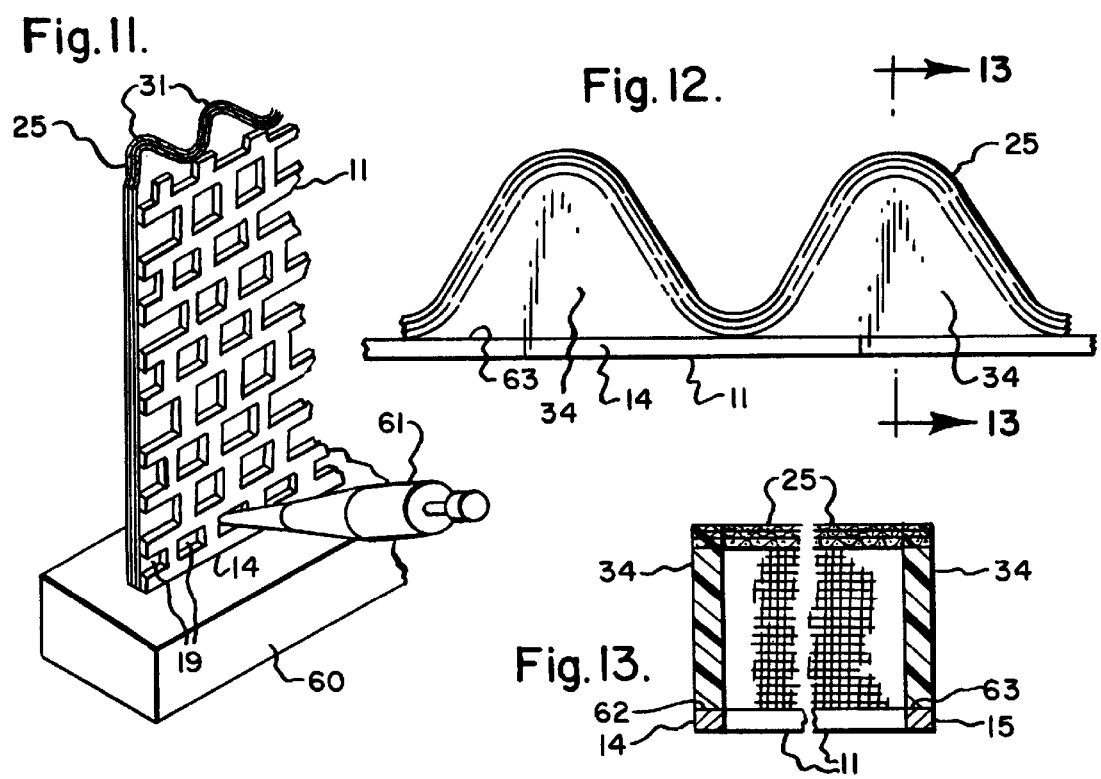

Fig. 19.
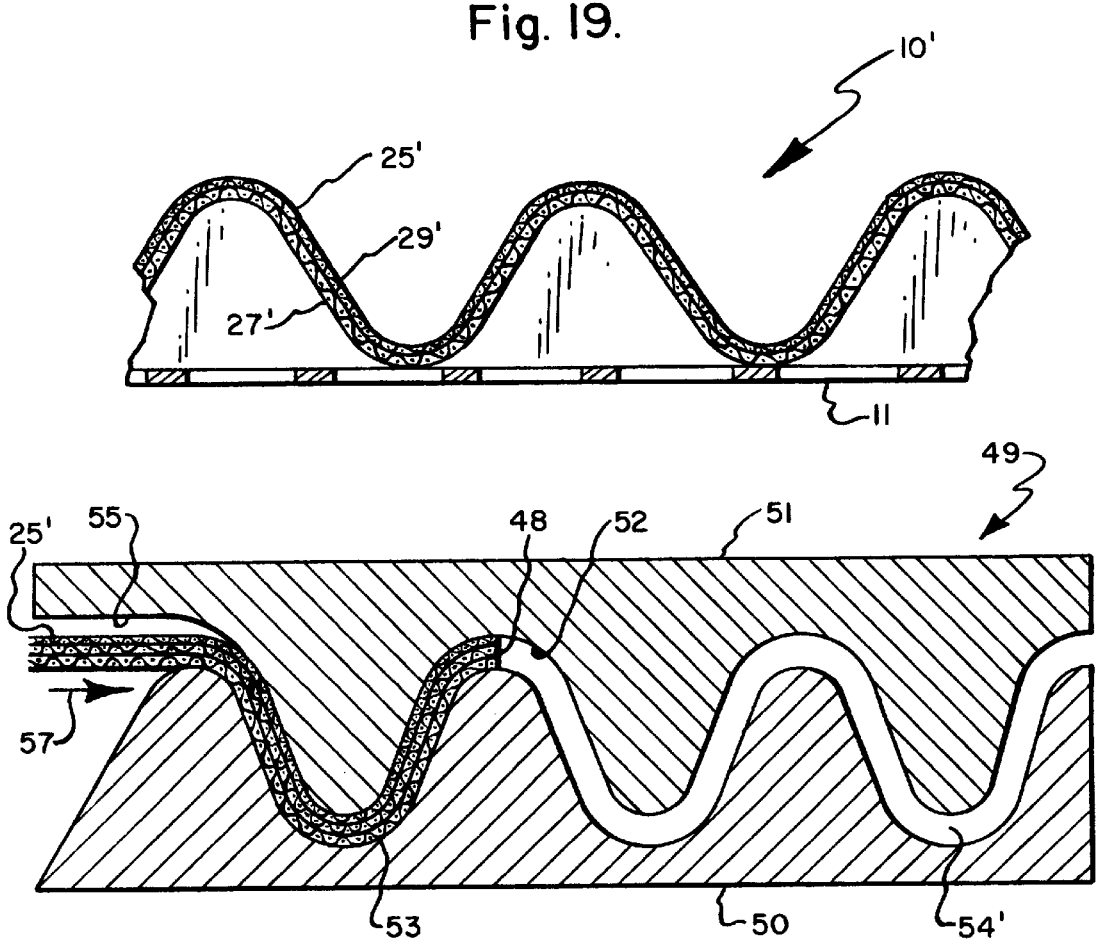
Fig. 9.
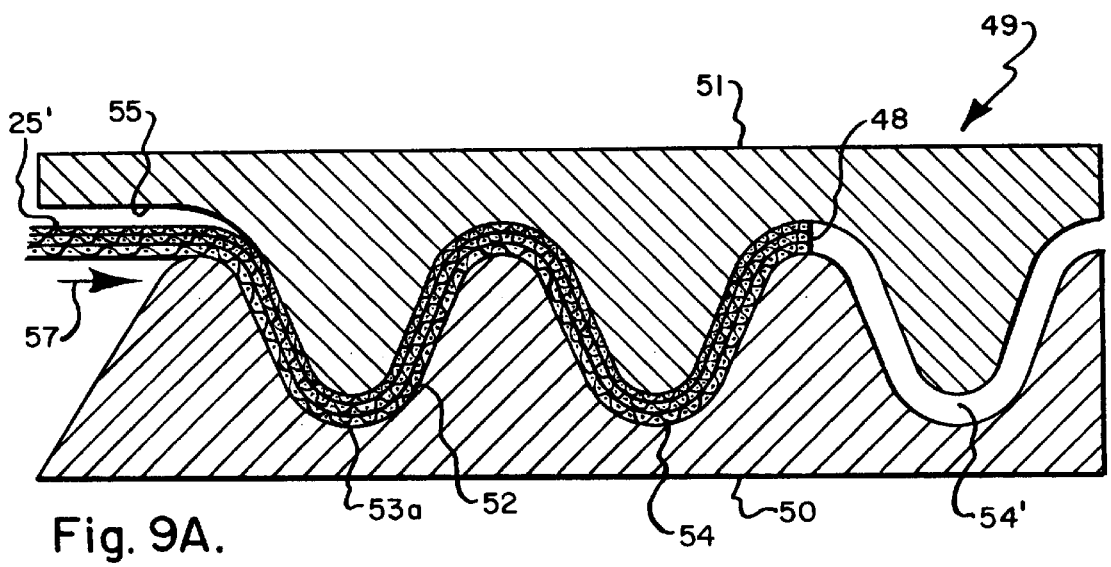
Fig. 9A.

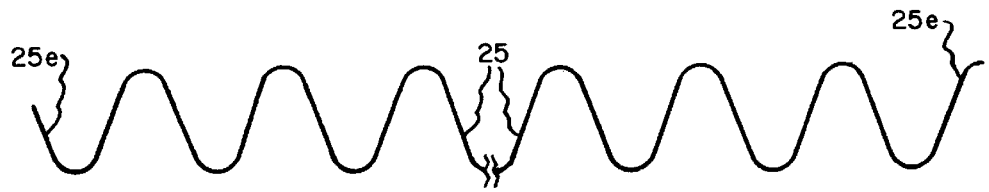
Fig. 9B.
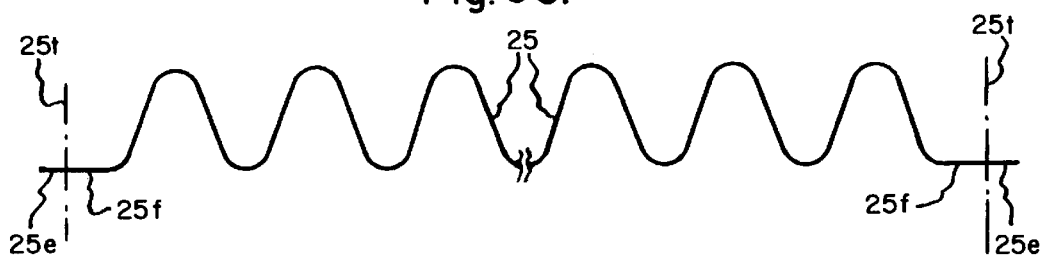
Fig. 9C.
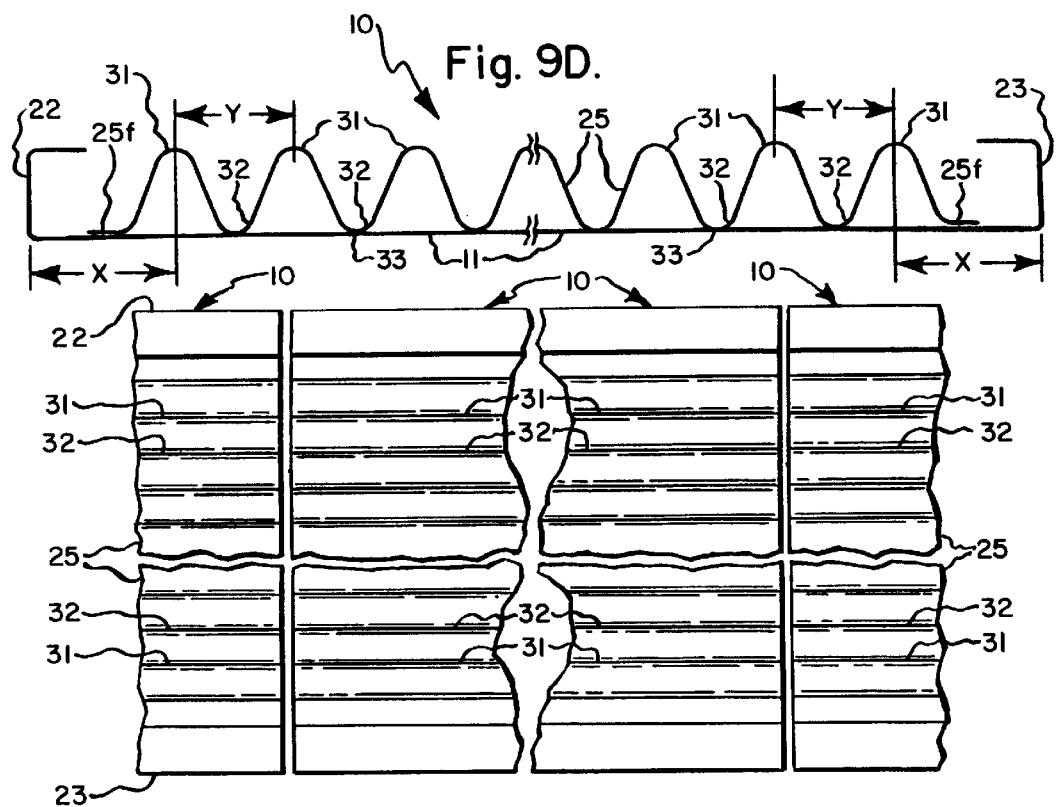
Fig. 9D.
Fig. 20.

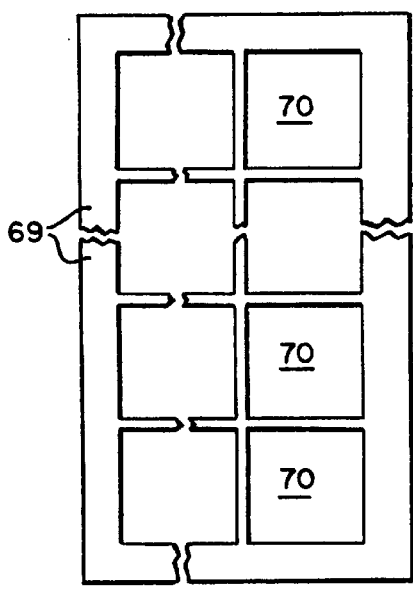
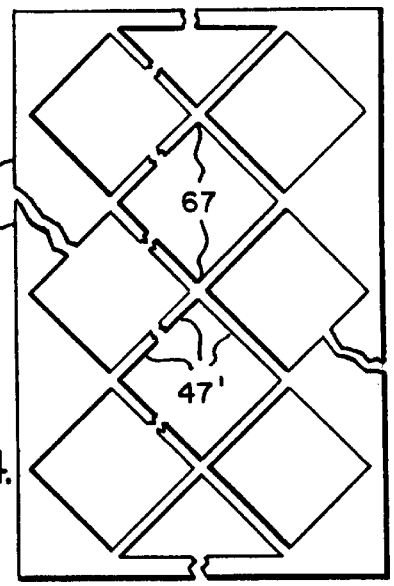
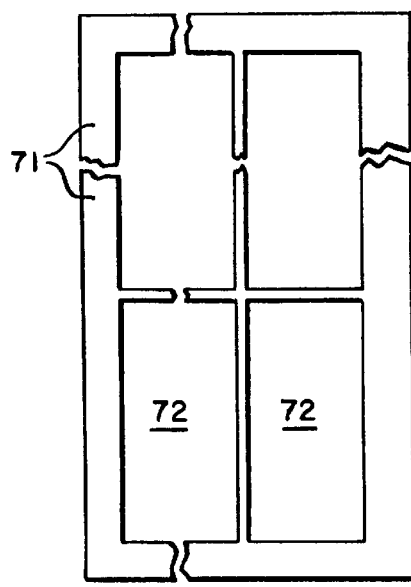
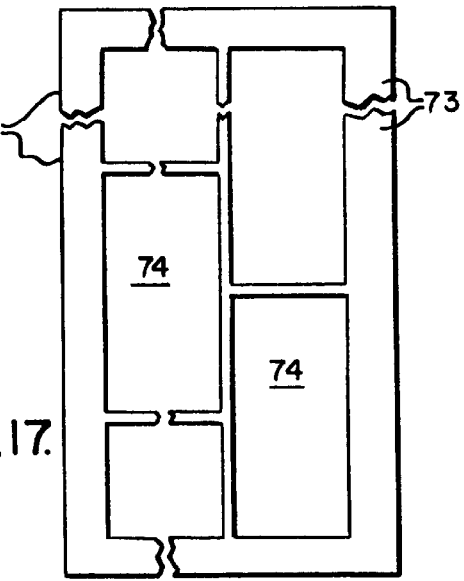
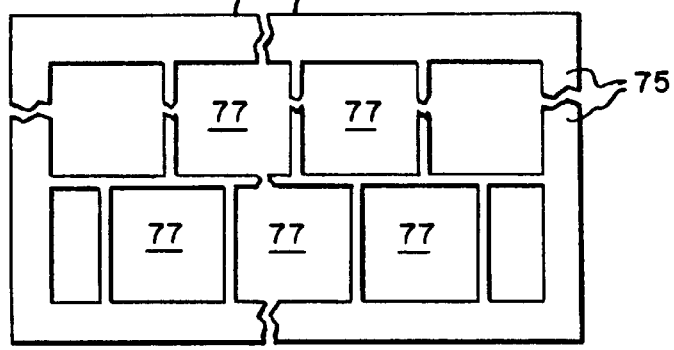

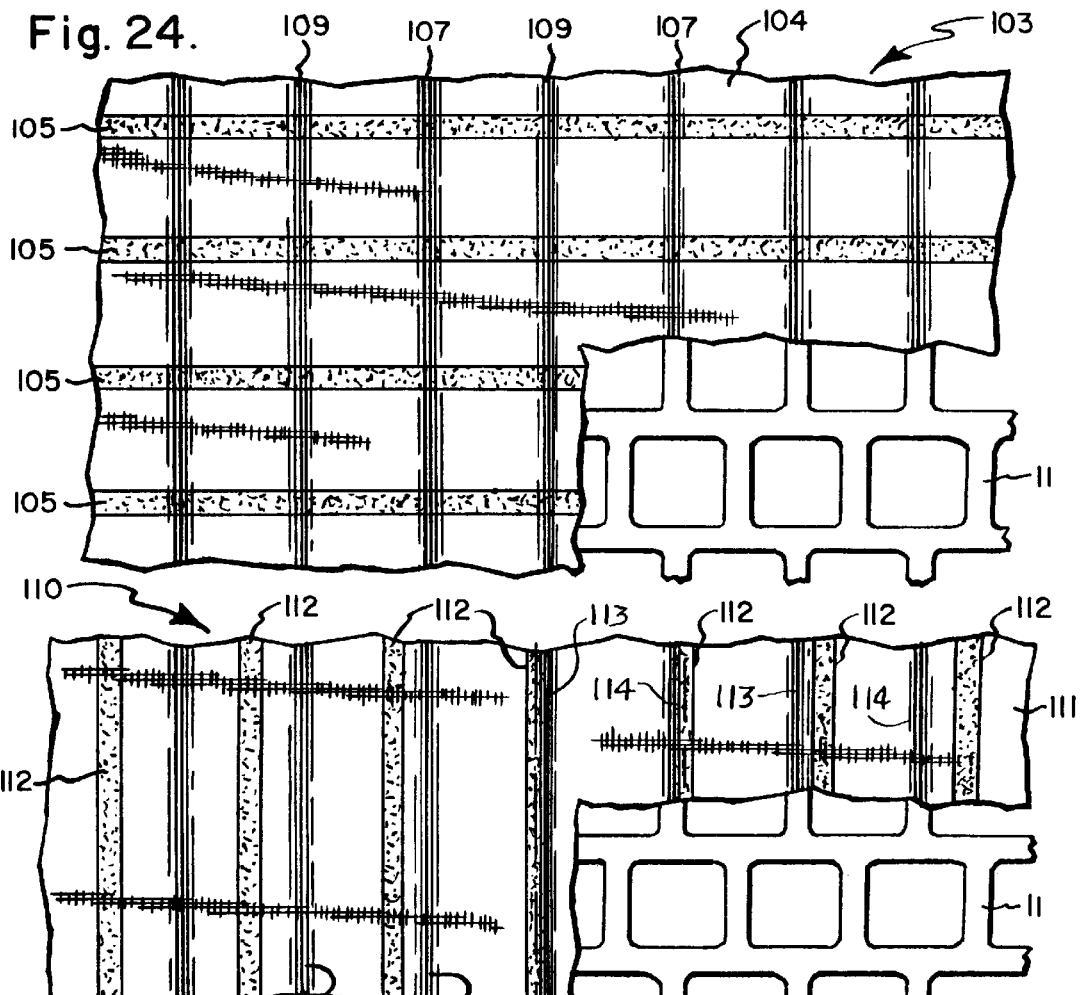
Fig. 24.
Fig. 25.
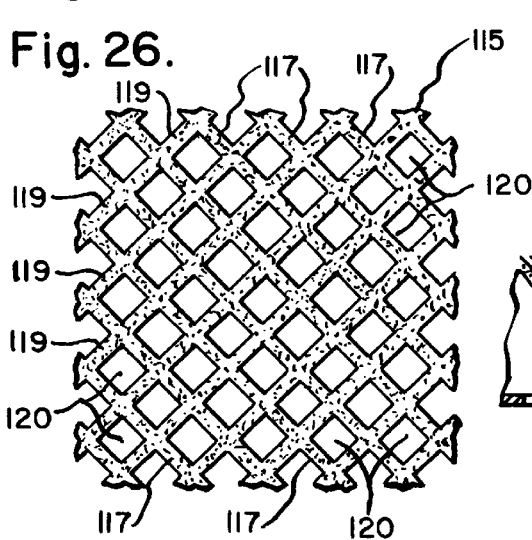
Fig. 26.
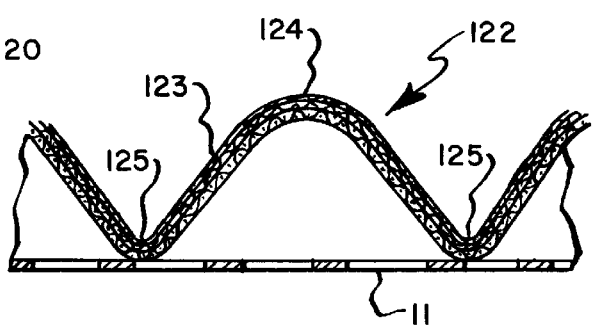
Fig. 27.

UNDULATING SCREEN FOR VIBRATORY SCREENING MACHINE AND METHOD OF FABRICATION THEREOF

CROSS REFERENCE TO RELATED APPLICATIONS

The present application is a continuation-in-part of application Ser. No. 08/443,377, filed May 17, 1995, which is a continuation of application Ser. No. 08/273,217, filed Jul. 11, 1994, now U.S. Pat. No. 5,417,859, dated May 23, 1995, which is a continuation-in-part of application Ser. No. 08/127,800, filed Sep. 28, 1993 (abandoned), which is a continuation-in-part of application Ser. No. 08/062,464, filed May 14, 1993, now U.S. Pat. No. 5,417,858, dated May 23, 1995, which is a continuation-in-part of application Ser. No. 08/004,122, filed Jan. 13, 1993 (abandoned).

STATEMENT REGARDING FEDERALLY SPONSORED RESEARCH OR DEVELOPMENT

Not Applicable

BACKGROUND OF THE INVENTION

The present invention relates to an improved vibratory screen assembly for a vibratory screening machine and to an improved method of fabrication thereof.

In parent patent application Ser. No. 08/062,464, filed May 14, 1993, now U.S. Pat. No. 5,417,858, dated May 23, 1995, a vibratory screen assembly is disclosed having an undulating screen subassembly bonded to a perforated plate and frame. In copending patent application Ser. No. 08/443, 377, filed May 17, 1995, a vibratory screen assembly is disclosed which is an improvement over the prior assembly in that the screen subassembly is bonded by a fused plastic grid which is bonded to a frame or plate. The vibratory screen assemblies of the present invention are improvements over the embodiments disclosed in the parent applications and patents.

BRIEF SUMMARY OF THE INVENTION

It is one object of the present invention to provide an improved vibratory screen assembly wherein an undulating screen is bonded to a perforated plate or frame in an improved manner so that there is a relatively large bonding area there-between.

Another object of the present invention is to provide an improved screen for a vibratory screening machine which can be fabricated in a relatively simple and efficient manner.

A further object of the present invention is to provide an improved method for fabricating an undulating vibratory screen assembly for a vibratory screening machine. Other objects and attendant advantages of the present invention will readily be perceived hereafter.

The present invention relates to a screening screen assembly comprising a screen assembly for screening material in a vibratory screening machine, said assembly comprising a plate having opposite edges, a plurality of apertures in said plate, aligned spaced plate members extending transversely to said opposite edges and located on opposite sides of said plurality of apertures, a screen formed in an undulating shape with elongated substantially parallel ridges, troughs formed between said ridges for conducting material which travels longitudinally of said troughs while it is being screened, and undersides on said troughs, said undersides of said troughs being aligned with and secured to said aligned spaced plate members on the opposite sides of a plurality of said apertures.

The present invention also relates to a screen assembly for screening material in a vibratory screening machine, said assembly comprising a frame having opposite edges, a plurality of apertures in said frame, aligned spaced frame members extending transversely to said opposite edges and located on opposite sides of said plurality of apertures, a screen formed in an undulating shape with elongated substantially parallel ridges, troughs formed between said ridges for conducting material which travels longitudinally of said troughs while it is being screened, and undersides on said troughs, said undersides of said troughs being aligned with and secured to said aligned spaced frame members on the opposite sides of a plurality of said apertures.

The present invention also relates to a method of fabricating a screening screen assembly for a vibratory screening machine comprising the steps of a method of fabricating a vibratory screen for a vibratory screening machine comprising the steps of providing an apertured plate having opposite edges with aligned spaced plate members extending transversely to said opposite edges, providing an undulating screen having ridges and troughs with undersides, aligning said undersides of said troughs with said aligned spaced plate members, and securing said undersides of said troughs to said aligned spaced plate members.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 6 is an exploded perspective view showing the components of one embodiment of the screening portion of the screen assembly prior to being bonded together;

FIG. 7 is a fragmentary plan view of a pattern of the perforated plastic grid which is used to bond the screens of the screen assembly together;

FIG. 8 is a schematic view showing the step of bonding the screens together by the use of the perforated plastic grid;

FIG. 8A is a fragmentary end elevational view of the screen laminate after the individual screens have been bonded together;

FIG. 9 is a schematic view of the first step in the forming of the bonded screens into an undulating shape;

FIG. 9A is a schematic view of the second step in forming the bonded screens into an undulating shape;

FIG. 9B is a fragmentary diagrammatic view of the undulating screen immediately after it has been formed;

FIG. 9C is a fragmentary diagrammatic view of the undulating screen after its ends have been flattened;

FIG. 9D is a fragmentary diagrammatic view of the undulating screen of FIG. 9C being aligned with the perforated plate to which it is to be bonded;

FIG. 10 is a reduced diagrammatic end elevational view showing the undulating screen being bonded to the perforated plate;

FIG. 11 is a fragmentary perspective view showing the process of sealing the open ends of the ridges of the undulating screen;

FIG. 12 is a fragmentary end elevational view showing the sealed ends of the ridges;

FIG. 13 is a fragmentary cross sectional view taken substantially along line 13—13 of FIG. 12 showing the seals in the ends of the ridges;

FIG. 14 is a fragmentary plan view of an alternate pattern of a perforated plastic grid which can be used to bond the screens;

FIG. 15 is a fragmentary plan view of another pattern of a plastic grid which can be used for bonding the screens;

FIG. 16 is a fragmentary plan view of still another pattern of a plastic grid which can be used to bond the screens;

FIG. 17 is a fragmentary plan view of still another pattern of a plastic grid which can be used to bond the screens;

FIG. 18 is a fragmentary plan view of still another pattern of a plastic grid which can be used to bond the screens;

FIG. 19 is a fragmentary cross sectional view similar to FIG. 3 but showing another embodiment;

FIG. 20 is a fragmentary plan view of a plurality of undulating screen assemblies aligned on the bed of a vibratory screening machine;

FIG. 24 is a fragmentary plan view of yet another embodiment wherein the screens of the undulating screen subassembly are fused to each other by elongated strips which extend perpendicularly to the troughs and ridges;

FIG. 25 is a fragmentary plan view of yet another embodiment wherein the screens of the undulating screen subassembly are bonded to each other by strips of plastic which extend lengthwise of the troughs and ridges;

FIG. 26 is a fragmentary plan view of yet another embodiment of a plastic grid which can be used to bond the support and screening screens to each other into an undulating screen subassembly;

FIG. 27 is a fragmentary cross sectional view similar to FIG. 3 and showing yet another cross sectional configuration to which the screens can be formed;

DETAILED DESCRIPTION OF THE INVENTION

An embodiment of a prior screen assembly 10 is shown in FIGS. 1–5, and its method of fabrication is shown in FIGS. 6–13, and alternate configurations of a plastic grid which can be used in the process of fabricating the screen are shown in FIGS. 14–18, and alternate embodiments are shown in FIG. 19, and in FIGS. 21–28.

Figure 1:
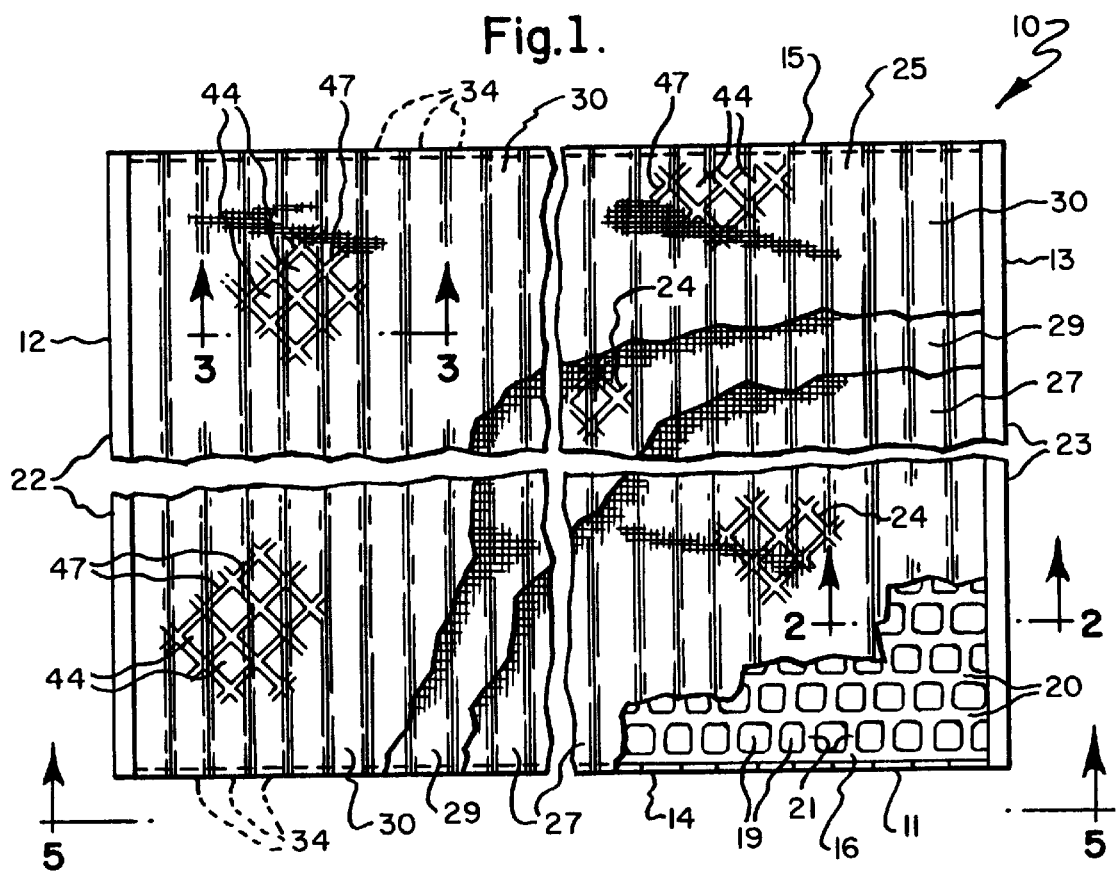
FIG. 1 is a fragmentary plan view of a previous screen assembly with portions broken away to show various layers thereof.
Figure 2:
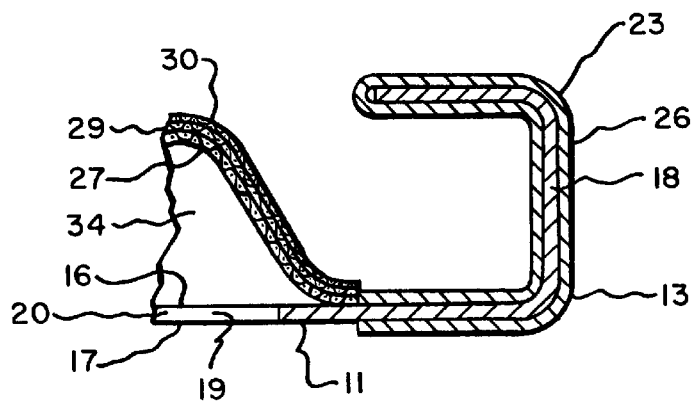
FIG. 2 is a fragmentary enlarged cross sectional view taken substantially along line 2—2 of FIG. 1 and showing primarily the construction at the ends of the screen supporting plate for securing the vibratory screen in a vibratory screening machine.

The screen assembly 10 of FIGS. 1–5 includes a frame in the form of a perforated metal plate 11, such as steel or any other suitable metal, having a first pair of opposite edges 12 and 13 and a second pair of opposite edges 14 and 15 and an upper surface 16 and a lower surface 17. Plate 11 includes apertures 19 which are bordered by elongated metal strip-like portions or members 20 which extend between edges 12 and 13 and by shorter strip-like portions 21 which extend lengthwise between elongated strip-like portions 20. The openings 19 are formed by a punching operation and are quadrangles of approximately 1 inch square with rounded corners but they may be of any other desired shape or size. Strip-like portions 20 and 21 are approximately $\frac{1}{10}$ of an inch wide, but they may be of any desired width. The length of plate 11 between edges 12 and 13 may be approximately 3½ feet and its width between edges 14 and 15 may be approximately 2½ feet, and it may have a thickness of about $\frac{1}{16}$ of an inch. However, it will be appreciated that the size of plate 11 may vary as required to fit different machines. The width of each opening 19 is a small fraction of the length of the plate between edges 12 and 13. The same is true of the relationship between the height of openings 19 and the width of the plate between edges 14 and 15. Channel-shaped members 22 and 23 are mirror image counterparts and are constructed as shown in FIG. 2. More specifically, an extension 18 of plate 11 is folded into a channel-shaped configuration and a member 26 is bent to the shape shown in FIG. 2 from a single piece of metal and it brackets the edge 13 in the manner depicted in FIG. 2 and it is welded thereto. Channel-shaped member 22 is of the same construction. The foregoing description of plate 11 is essentially set forth in U.S. Pat. No. 4,575,421. As will be apparent hereafter, any suitable plate or any suitable frame which provides the frame portions or members to which a screen can be attached may be utilized. A frame configuration is shown in FIG. 8 and described in column 5, lines 37–68, of U.S. Pat. No. 5,417,858, dated May 23, 1995, which is a continuation-in-part of abandoned application Ser. No. 08/004,122, filed Jan. 13, 1993, and is incorporated herein by reference.

Figure 3:
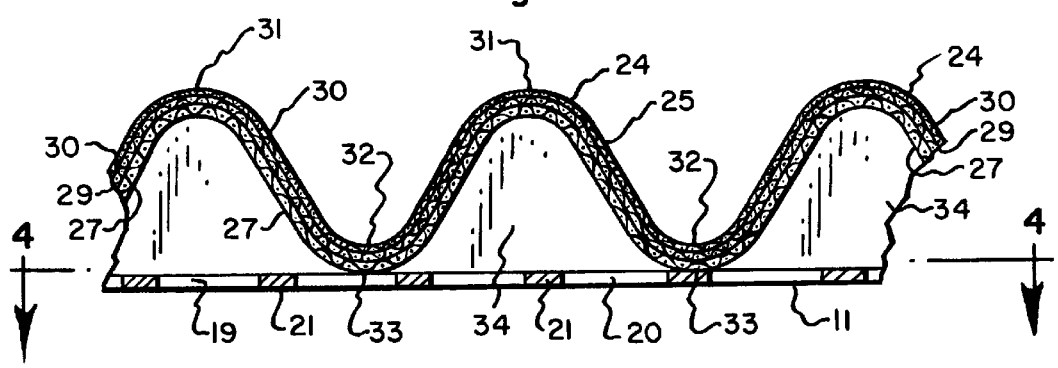
FIG. 3 is a fragmentary cross sectional view taken substantially along line 3—3 of FIG. 1.
Figure 4:
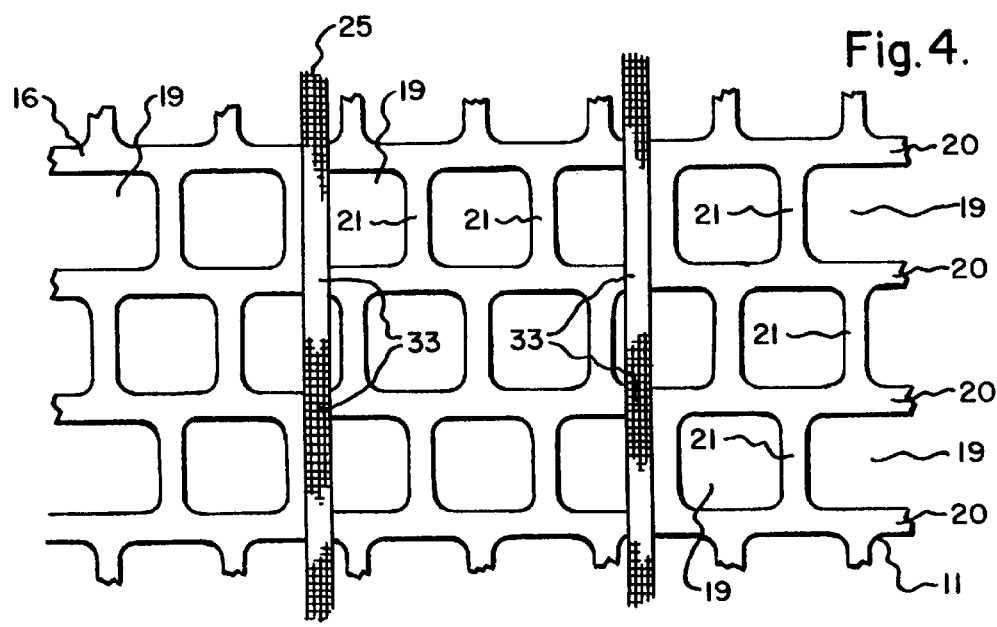
FIG. 4 is a cross sectional view taken substantially along line 4—4 of FIG. 3.
Figure 5:
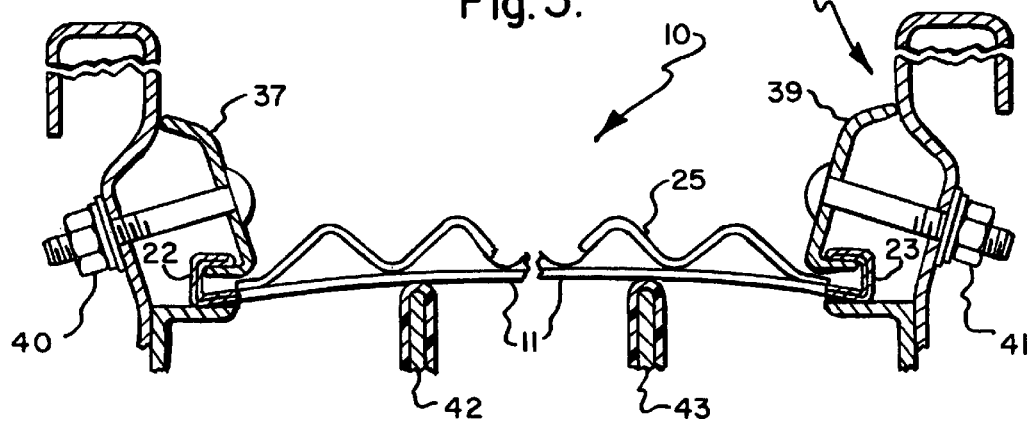
FIG. 5 is a fragmentary end elevational view taken substantially in the direction of arrows 5—5 of FIG. 1 and showing, in addition to the screen, portions of a vibratory screening machine which may support the screen assembly.

The main feature of the embodiment of FIGS. 1–5 is that the plurality of screens which are secured to plate 11 are bonded together into a subassembly by a perforated plastic grid 24 which has been fused into the screens by suitable heat and pressure. Thus, the screen subassembly 25 includes a coarse screen 27 which serves a supporting function and may have a size of between 6 mesh and 20 mesh or any other suitable size. A fine screening screen 29 is bonded to coarse supporting screen 27 and it may have a mesh size of between 30 mesh and 325 mesh, or any other suitable size. A finer screening screen 30 is bonded to fine screening screen 29 and it may have a mesh size of between 40 mesh and 400 mesh, or any other suitable size. Preferably the intermediate fine screen 29 should be two U.S. sieve sizes coarser than the finer uppermost screen 30. The three screens 27, 29 and 30 are bonded to each other by a fused plastic grid 24 which permeates all three screens. The screen subassembly 25 is formed in undulating curved shape, as depicted in FIG. 3, and it has ridges 31 and troughs 32. The undersides of troughs 32 at 33 are bonded to plate 11 by a suitable adhesive such as epoxy. This bonding at 33 occurs at all areas where the undersides of the troughs 32 contact strips 20 and 21, as depicted in FIG. 4. The open ends of the ridges 31 are sealed or blocked by polyurethane caps 34 which are molded into place in a manner which will be described hereafter relative to FIGS. 11–13.

The screen assembly 10 can be mounted in a vibrating screening machine 35 by means of elongated channel-shaped drawbars 37 and 39 which engage channels 22 and 23, respectively, and are drawn up by means of nut and bolt assemblies 40 and 41, respectively, as is well known in the art. Screen assembly 10 rests on a well known type of frame (not fully shown) having a plurality of elongated members 42 and 43 extending parallel to channels 22 and 23. In its operative position, screen assembly 10 is bowed slightly so that its center along a line parallel to edges 12 and 13 is higher than the outer edges 12 and 13, as is well known. However, the screen assembly 10 can be mounted in any other manner by any other type of mounting arrangement depending on the machine in which it is used. The channels 37, 39 and draw bolts 40, 41 do not form any part of the present invention and are merely disclosed as being representative of one type of mounting, and it will be appreciated that other mounting structures known in the art may be utilized.

The screen subassembly 25 consisting of bonded screens 27, 29 and 30 is formed in the following manner, as schematically depicted in FIGS. 8, 8A, 9 and 9A–9D. The screens 27, 29 and 30 and the plastic grid 24 are superimposed in contiguous abutting relationship in the order shown in FIG. 6, and suitable heat and pressure are applied to bond the foregoing parts into a unitary configuration wherein the plastic grid 24 fuses in a precisely controlled pattern and permeates the three screens 27, 29 and 30 and bonds them together, as can be seen from FIG. 1. The fact that the grid 24 fuses in a precisely controlled pattern obviates the difficult requirement of precisely controlling the amount of adhesive which is applied. In this respect, if the screens are bonded with too much adhesive, such as epoxy, their open area is reduced, and if they are bonded with too little, they will not be attached to each other with sufficient strength. Furthermore, the use of a plastic grid enhances the ease of production.

The plastic grid 24 provides a gridwork within the screen assembly 25 wherein there are openings 44 (FIG. 1) between the plastic portions of the grid 24. A fragmentary plan view of the plastic grid is shown in FIG. 7 and it includes a border 45 and grid border portions 47 which outline openings 44. The plastic grid 24 is preferably made of polyethylene, and in this instance it was approximately 0.062 inches thick in the form shown in FIG. 6, that is, before it was fused by heat and pressure into bonding relationship with screens 27, 29 and 30. The bonding was effected by pressing the superimposed abutting screens 27, 29 and 30 and plastic grid 24 with a heated platen. The temperature of the platen was approximately 450° F. and it was applied at a pressure of 12 psi for approximately two minutes. The main consideration was that the polyethylene grid 24 should be fused to a sufficient degree so that it will permeate the openings in screens 27, 29 and 30 and bond them together. It will be appreciated that any other suitable plastic, such as polypropylene, which is heat-fusible may be used. It will also be appreciated that the bonding temperatures, pressures, and times of pressing will vary with the plastic, its thickness, the types of screens being bonded, and other factors.

After the screens were bonded to each other as depicted in FIG. 8, and they formed a planar laminate 25' as shown in FIG. 8A, they were formed into the undulating shape shown in FIG. 3 by a suitable die arrangement 49 schematically shown in FIGS. 9 and 9A. The die arrangement included a lower die 50 and an upper die 51. The forming is effected by leading the edge portion 48 of the planar laminate 25' into the cavity 52 and forming an undulating shape 53 therein by bringing the upper die 51 downwardly into mating engagement with lower die 50. Thereafter, the undulating shape 53 is placed into cavity 54 and the upper die 51 is brought into forming position to form undulation 53a. The male die will thus hold the previously formed undulation 53 against movement while the straight portion of laminate 25' which overlies cavity 52 is itself formed into an undulating shape 53a. It is to be noted that there is a clearance 55 at the entry portion between dies 50 and 51, and thus the straight portion of laminate 25' can move in the direction of arrow 57 as it is initially formed into configuration 53 and thereafter the straight portion can move in the direction of arrow 57 as the laminate is formed into undulation 53a. Thereafter, undulation 53 is placed into cavity 54', and undulation 53a is placed in cavity 54, and the next undulation is formed in cavity 52. The foregoing process is repeated until all of the undulations have been formed one at a time.

It will be appreciated that if an attempt were made to form the undulations of the entire screen at the same time instead of forming each undulation sequentially, the screen would be subjected to tearing stresses because there would not be the movement in the direction of arrow 57 as described above. However, by forming each undulation separately and sequentially while permitting the straight portion of laminate 25' to move in the direction of arrow 57 as the dies 50 and 51 are closed, tearing is obviated. The forming of undulations in the foregoing manner may be a conventional technique applied to other structures, which in this instance, is being applied to a screen laminate.

The use of the polyethylene plastic for the bonding of the screens is beneficial because the polyethylene has a certain amount of yieldability, and thus when the undulations are formed as depicted in FIGS. 9 and 9A, the polyethylene bonding will yield slightly to permit relative movement between the separate screens 27, 29 and 30 as the laminate 25' is formed into an undulating shape. This is advantageous over the use of epoxy, such as used in the past, because the very fine mesh screens, such as those over 200 mesh, could tear when they are bent into a convex shape during the forming of the corrugations when the yielding was not experienced. Furthermore, the yieldability of the polyethylene permits a certain amount of relative movement between the screens when they are subjected to high G forces in operation, thus lessening the tendency of the screen to tear and blind.

It is to be noted that plastic grids have been used in the past to bond screening screens together which were utilized in vibratory screening machines in a flat condition rather than in an undulating shape. Flat plastic bonded screens of this prior type did not function successfully in operation because the fused plastic grid permitted the screens to stretch when subjected to the high G forces encountered in operation. The reason that they stretched was that the entire width of the flat screens between their edges were unsupported. In contrast to the foregoing, the unsupported spans in the corrugated screen of the present invention is between troughs 32, and the stretching of the fused plastic is not a factor which adversely affects the operation. In fact, it is beneficial because it provides limited amounts of yieldability, as discussed above.

Summarizing the foregoing, it is believed that the plastic grid permits the screen subassembly to be formed into an undulating shape because the fused plastic will permit the fine wires of the screening screens to yield relative to the other wires to which they are bonded when they are formed into a convex shape at the crests of the undulations, thereby obviating the tearing which could otherwise occur when unyielding epoxy was used. Furthermore, even though the fused plastic does not have the adhesive strength of epoxy, and even though the fused plastic grid does not have sufficient bonding strength to maintain flat screens securely bonded in operation, the present undulating screens will not yield excessively in operation because of the fact that the unsupported spans of screen are short, namely, from trough to trough, and the fused plastic is strong enough to maintain the required bond of the screens in such unsupported spans. In addition, the plastic grid greatly simplifies fabrication of the undulating screen.

After the undulating screen subassembly 25 has been completely formed in the manner described above relative to FIGS. 9 and 9A, it has the shape such as shown in FIG. 9B wherein the ends 25e are not flattened. The next step in fabricating the screen subassembly 25 is to flatten the ends 25e as shown in FIG. 9C. Thereafter, the ends 25e are trimmed, if necessary, as depicted by dotted lines 25t so that a proper amount of flattened portion 25f remains for bonding to plate 11. The next step in the process is to locate the screen subassembly 25 on plate 11 in the following manner, as shown in FIG. 9D. In this respect, it is required that the precise number of ridges 31 should exist in the screen and that the ridges 31 must be spaced apart a predetermined distance, such as Y. Thereafter, the flattened portions 25f and the undersides of troughs 32 are bonded at 33 to plate 11. However, before this bonding occurs, the ridges 31 at the extreme outer ends of the screen subassembly 25 are precisely located a distance X from channels 22 and 23 of plate 11. Therefore, since the crests of each of the ridges 31 are spaced from each other the predetermined distance Y and since the crests of the outer ridges 31 are spaced from channels 22 and 23 a precise distance X, each screen assembly 10 will be exactly like every other one which is made. The significance of this is that when the plurality of screen assemblies 10 are placed end-to-end on the bed of a vibratory screening machine, the troughs of adjacent assemblies 10 will be in exact alignment with each other, as will the ridges be. This is shown in FIG. 20. Therefore, there will be a clear path lengthwise of the bed of the vibratory screening machine for material to pass from each screen assembly 10 to its adjacent screen assembly 10.

The contacting portions of the screen subassembly 25 and plate 11 are bonded to each other by epoxy, as mentioned above. This bonding is effected by dipping a heated perforated plate 11 into a fluidized powdered epoxy bed so that the powdered epoxy adheres to the plate. The plate with a layer of powdered epoxy thereon is then cooled. Thereafter, it is reheated to 350° F., and a suitable press (not shown) is used to hold the undersides of the troughs of the screen subassembly 25 in engagement with plate 11 for approximately three minutes and the epoxy will fuse into the undersides of the troughs of the screens. After the epoxy cools, the undulating screen will be bonded to the plate. The foregoing broad technique of bonding by the use of powdered epoxy is conventional in the art. if desired, the screen subassembly can be adhesively secured to plate 11 by the use of liquid epoxy which is applied to the upper surface of the plate. It will be appreciated that any other suitable method of bonding the screen subassembly to the plate may be used.

After the undulating screen subassembly 25 has been bonded to plate 11, the open ends of the ridges 31 are sealed as depicted in FIGS. 11–13. In this respect, a chilled block 60 is provided, and the edge of the screen assembly 10, such as 14, is placed in abutting relationship therewith. The block is chilled to –50° F. by passing suitable refrigerant through a coil therein (not shown). Thereafter, a syringe, such as 61, containing liquid polyethylene is inserted through various of the apertures 19 adjacent edge 14 to supply polyurethane of sufficient depth to form caps 34. The chilled plate 60 hastens solidification of caps 34. The same procedure is applied at edge 15. It will be appreciated that caps 34 permeate the screen subassembly 25 and also provide a seal with the edge portions 62 and 63 of edges 14 and 15, respectively. As an alternate, liquid epoxy can be used to produce caps 34. Also, the ends of the ridges may be blocked by any other suitable method which may include but are not limited to those shown in patent application Ser. No. 08/062,464, now U.S. Pat. No. 5,417,858.

In FIGS. 14–18 alternate configurations of plastic grids are disclosed. The grid 24a of FIG. 14 is extremely similar to that of FIG. 7, the only difference being that the portions 47' are slightly thinner than portions 47 of FIG. 7 and also the crossover areas 67 are slightly smaller. In FIG. 15 the plastic grid 24b includes a border portion 69 and the grid is in the form of square openings 70. In FIG. 16 the grid 24c includes a border 71 and elongated rectangular openings 72. In FIG. 17 the grid 24d includes a border portion 73 and rectangular openings, such as 74, which are staggered relative to each other. The grid 24e of FIG. 18 includes a border portion 75 and square openings 77 which are staggered relative to each other as shown.

In FIG. 19 another embodiment of the present invention is shown. Screen 10' differs from screen 10 in that the undulating screen subassembly 25' only has a support screen 27', which is analogous to screen 27, and a single screening screen 29', which is analogous to screen 29. The screens 27' and 29' are laminated to each other by the use of a plastic grid, such as 24, in the same manner as described above, and the laminate of screens 27' and 29', which are bonded by the fused plastic grid, is corrugated into an undulating shape in the manner described above, and thereafter bonded to an apertured plate 11 in the manner described above. In other words, the only difference between the structures of screen assemblies 10 and 10' and the methods of making thereof is that the former has a support screen and two screening screens, and the latter has a support screen and one screening screen.

A screen which has proved satisfactory in tests had the following dimensions: The plate 11 had the dimensions set forth above relative to FIGS. 1–5. The base screen 27 was 20 mesh, the intermediate screen 29 was 180 mesh and the uppermost screen 30 was 210 mesh. The undulating screen had a dimension of 1.6 inches between cycles, that is 1.6 inches between adjacent crests and 1.6 inches between the bottoms of adjacent troughs. Also, the radius at the bottoms of the troughs was ¼ inch and the radius at the crests was ½ inch. The height of the ridges from plate 11 to the tops of the ridges was one inch. It will be appreciated that the curvature may be of any desired dimension which will provide the proper results.

Figure 21:
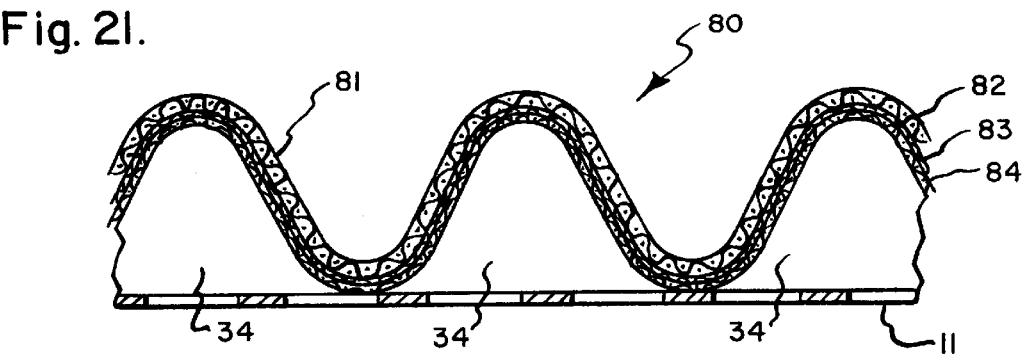
FIG. 21 is a fragmentary cross sectional view similar to FIG. 3 but showing an alternate embodiment wherein the fine screen side of the undulating screen is bonded to the perforated plate.

In FIG. 21 another embodiment 80 of a screen assembly is disclosed. Screen assembly 80 includes a perforated metal plate 11 which may be identical to plate 11 described above. Screen assembly 80 includes a screen subassembly 81 consisting of a support screen 82, a finest screening screen 83, and a fine screening screen 84 which are bonded to each other by a fused plastic grid as described above relative to FIGS. 1–18. Screens 82, 83 and 84 are analogous to screens 27, 30 and 29, respectively, of FIG. 3. The difference between the embodiment of FIG. 3 and the embodiment of FIG. 21 is that the fine screening screen 83 is bonded to plate 11 and the finest screen 84 lies between it and coarse support screen 82, whereas in FIG. 3 it is the support screen 27 which is bonded to the support plate, and the fine screen 29 lies between it and the finest screen 30. The advantage of the construction of FIG. 21 is that the coarse support screen 82 protects the screening screens 83 and 84 from tearing and abrasion because it bears the brunt of the forces produced by the material which is being screened. Aside from the differences in orientations between the screen subassembly 81 of FIG. 21 and the subassembly 25 of FIG. 3, all other parts of screen assembly 80 may be identical to screen assembly 10 of FIGS. 1–5 and it may be fabricated in the same manner as described in the other portions of this specification.

Figure 22:
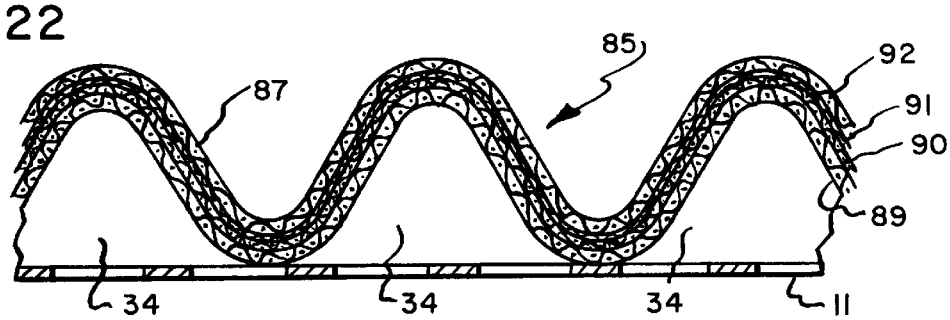
FIG. 22 is a fragmentary cross sectional view similar to FIG. 3 and showing still another embodiment wherein coarse support screens are located on opposite sides of the two fine intermediate screens.

In FIG. 22 yet another embodiment of a screen assembly 85 is disclosed. In this embodiment the screen subassembly 87 includes a coarse support screen 89, a fine screening screen 90, a finer screening screen 91 and a coarse support screen 92, all bonded together in the disclosed order in the manner described above relative to FIGS. 1–18. In this embodiment the coarse support screen 89 is adjacent plate 11 and bonded thereto, and coarse support screen 92 overlies the finest screening screen 91, and support screen 92 serves the same purpose as coarse screen 81 of FIG. 21, namely, to protect screens 91 and 90 from abrasion and the forces to which they are subjected by the material which is being screened.

The screen assembly 85 is prepared in the same manner as described above relative to the preceding figures. The only difference between the embodiment of FIG. 22 and the embodiment of FIG. 3 is that the embodiment of FIG. 22 has a coarse support screen 92 overlying the finest screening screen 91.

Figure 23:
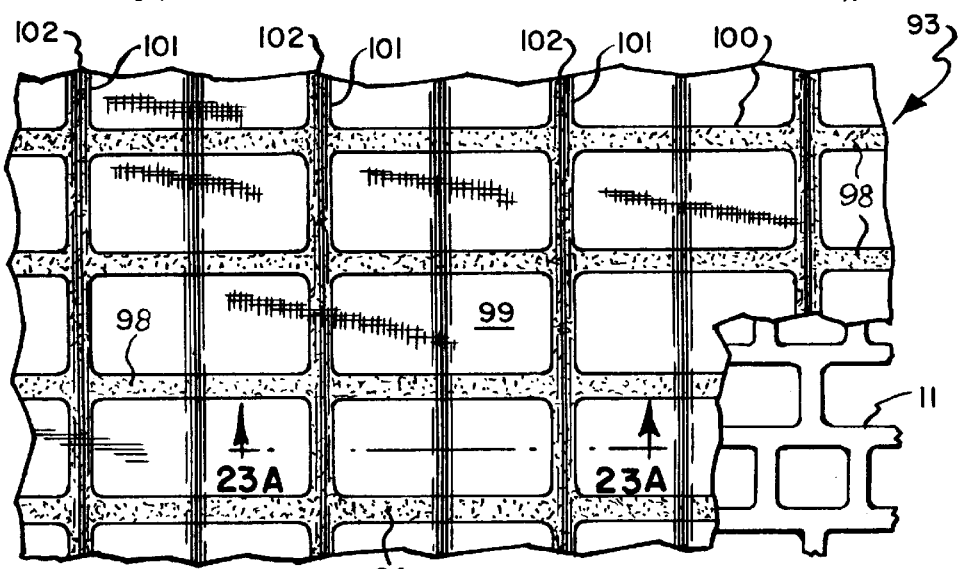
FIG. 23 is a fragmentary plan view of yet another embodiment wherein the troughs are reinforced by fused plastic strip portions which extend lengthwise of the troughs.
Figures 23A, 28:
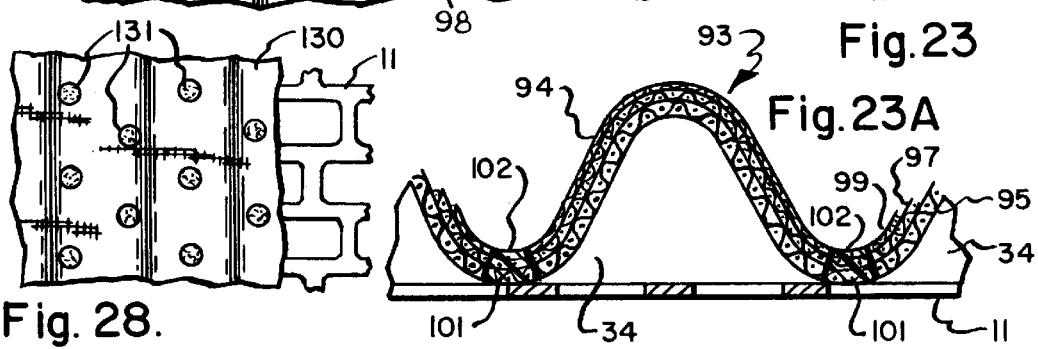
FIG. 23A is a fragmentary enlarged cross sectional view taken substantially along line 23A—23A of FIG. 23.
FIG. 28 is a fragmentary plan view of another embodiment in which the screens of the undulating screen subassembly are bonded by plastic portions which are spots.

In FIGS. 23 and 23A yet another embodiment of a screen assembly is disclosed. The screen assembly 93 includes a perforated plate 11, which is identical to plate 11 described above. Plate 11 has bonded thereto an undulating screen subassembly 94 which includes a coarse support screen 95, a fine screening screen 97, and an uppermost finest screening screen 99 which are bonded to each other by a plastic grid 100 of suitable plastic of the general type Ad described above in the preceding figures, except that the grid 100 is of a different shape in that it has strips 101 which are crossed by strips 98. The embodiment of FIGS. 23 and 23A has the feature that the plastic strips 101 of grid 100 are coincident with the lowermost portions of troughs 102 of the subassembly 94 so that strips 101 reinforce the screen subassembly at the bottoms of troughs 102 where it receives the most wear. The screen assembly 93 is fabricated in the same manner as described above relative to the preceding figures, except that the grid 100 is positioned so that strips 101 will be located at the bottoms of troughs 102. While a screen configuration such as shown in FIG. 3 is depicted it will be understood that it can be of any other combination of screens such as shown in FIGS. 19, 21, 22 and 27, but not limited thereto.

In FIG. 24 another embodiment of a screen assembly 103 is disclosed which includes a perforated plate 11 of the type described above and a bonded undulating screen subassembly 104 which may include any combination of screens, such as shown in FIGS. 3, 19, 21 and 22 or variations thereof except that they are bonded to each other by strips 105 of plastic rather than by a grid, such as shown in FIGS. 7, 14–18 and 23. In the embodiment of FIG. 24 the plastic strips 105 extend perpendicularly to the ridges 107 and troughs 109. The plastic strips 105, which fuse the screens to each other, may have the same physical parameters as described above relative to the grid of FIG. 7.

In FIG. 25 yet another screen assembly 110 is disclosed wherein an undulating screen subassembly 111 is bonded to a perforated plate 11 of the type described above. Screen subassembly 111 may be of the type shown in any of the FIGS. 3, 19, 21 and 22, or variations thereof. However, the individual screens of screen subassembly 111 are bonded to each other by plastic strips 112 which extend longitudinally of the ridges 113 and grooves 114. The physical parameters of the plastic strips 112 may be identical to those described above for the plastic grids which were used in the preceding figures. If desired, certain of the plastic strips may be oriented as shown in FIGS. 23 and 23A, namely, at the bottoms of the troughs.

In FIG. 26 yet another embodiment of a plastic grid 115 is disclosed. Plastic grid 115 differs from those shown in FIGS. 7 and 14–18 in that the cross strips 117 are much closer to each other and the cross strips 119 are much closer to each other so that the openings 120 between the strips are much smaller than the openings of the grids shown in FIGS. 7 and 14–18. In this respect, in the original grid the openings 120 are 1.0 centimeters square and the border strips 117 and 119 are 0.1 centimeters wide, and the grid has a thickness of 0.0625 inches, whereas in the grid of FIG. 7 the openings 44 are 2.54 centimeters square and the borders 47 are 0.125 inches wide. It will be appreciated that the borders widen as a result of fusing into the screens. The advantage of the construction of FIG. 26 is that the greater amount of plastic which is used to bond the screen subassemblies, such as shown in FIGS. 3, 19, 21 and 22, provides the screen subassembly in which it is used with greater resistance to abrasion and wear than those screen subassemblies which use grids which have larger openings between the plastic portions.

In FIG. 27 yet another embodiment of a screen assembly is disclosed. The screen assembly 122 includes a perforated plate 11 of the type described above and a screen subassembly 123 which is bonded thereto in the above-described manner. The screen subassembly 123, which is shown as being of the type of FIG. 3, can alternately be of the types shown in the other figures, such as 19, 21 and 22 or any of the other types. The only difference is in the manner in which the undulations are formed. In this respect, each ridge 124 has a very shallow curvature while each trough 125 has a sharper curvature. The advantage of the foregoing construction is that the fine screening screens at the ridges 124 have less stress placed on them during the process of forming them from a planar screen subassembly, such as shown in FIG. 8A. More specifically, it can be seen that the finer screening screens at the crest of the ridges are stretched during the forming process and it will be appreciated that the less they are stretched, the less likely they are to tear. Conversely, the relatively sharp curvatures at the troughs 125 do not exert stretching on the uppermost fine screening screens while the lowermost coarse support screen which faces perforated plate 11 can bear the stress resulting from forming the sharp curvature without tearing.

In FIG. 28 an embodiment is shown wherein the screens of the screen subassembly 130 are bonded by spaced circular spots 131 of the same type of plastic described above. Spots 131 may be of any desired size and preferably may be about one centimeter in diameter and be spaced any desired amount. The screen subassembly 130 may be any of the combinations of screens described above relative to FIGS. 3, 19, 21 and 22, and the subassembly is bonded to plate 11 in the above-described manner.

It can thus be seen that the screen subassemblies 80 and 85 of FIGS. 21 and 22 are variant forms of the previously disclosed screen subassemblies of FIGS. 3 and 19 in that the screens are oriented differently. However, as noted above, the screen subassemblies of FIGS. 21 and 22 are fabricated in the same manner as described above relative to the screen sub-assembly 25 of FIG. 3. The same is true of the embodiments of FIGS. 23, 24, 25, 27 and 28. In this respect, the screen sub-assemblies of FIGS. 23, 24, 25 and 28 may comprise any of the screen orientations shown in FIGS. 3, 19, 21 and 22. The only difference between the embodiments of FIGS. 24 and 25 relative to the preceding embodiments of FIGS. 3, 19, 21 and 22 is that the screen subassemblies 104 and 111 of FIGS. 24 and 25, respectively, are bonded to each other by strips of plastic rather than by grids.

It will be appreciated that, as desired, different screen subassemblies of the types shown in FIGS. 3, 19, 21 and 22 can be interchangeably bonded to a plate 11 or to a frame as desired for any particular vibratory screening function, depending on the characteristics which are desired. Furthermore, it will be appreciated that any of the individual screens of FIGS. 3, 19, 21 and 22 may be bonded to each other by any of the preceding described grids, strips or spots, as desired. The plate 11 which has been shown in the various figures is described in detail relative to FIGS. 1–5. Furthermore, the bonding process of fusing the plastic into the layered screens is the same regardless of whether the plastic is in the form of a grid, strips or spots. In all embodiments the original plastic is 0.0625 inches thick before it fuses into the screens and spreads out laterally, but it can be of any other suitable thickness. The primary criterion is that it should be sufficiently thick so as to penetrate all of the screens of the laminate.

The screen assemblies described above can be utilized for dry screening, or can be utilized for wet screening of drilling mud which is a slurry of mud and water, and it can also be utilized for other liquid suspensions, such as kaolin and water. A machine of the type which performs a wet screening operation is disclosed in U.S. Pat. No. 4,882,054.

The screen assembly 10, in addition to having all of the advantages enumerated above, also has all of the advantages of the screen assemblies disclosed in U.S. Pat. No. 5,517,858, dated May 23, 1995, which is incorporated herein by reference, and it will be appreciated that various alternate constructions shown in said prior patent can be used with the fused screen subassembly of the present invention provided they are not inconsistent therewith.

Any of the structural features of the screens of FIGS. 1–28 can be incorporated into the subject matter of the present invention which is set forth in FIGS. 29–36.

In accordance with one embodiment of the present invention, a screen assembly 130 (FIG. 29) is provided wherein a substantially planar flexible plate 131 has apertures 132 therein which are bordered by horizontal plate members 133 and elongated vertical plate members 134. The vertical plate members 134 are aligned in rows which extend transversely between edges 136 and 138 of plate 131. The rows of aligned plate members are also parallel to each other and to plate edges 128. An undulating screen 135 has ridges 137 and troughs 139, with the troughs being defined by the sides of the ridges. The screen 135 may be any of the above-described screen subassembly embodiments. Preferably it is an embodiment such as shown in FIG. 3. However, under certain circumstances the screen may also be a single screen, and not a screen having a plurality of screens bonded together. The screen assembly is of the type which is generally used in the manner shown in FIG. 5. However, instead of the channels shown on the edges of the plate in FIG. 5, plate 131 has upstanding edge portions 128 which are covered by a sheet metal (not numbered). It will be appreciated, however, that any suitable edges may be located on the plate for mounting the plate on a vibratory screening machine. While not specifically shown in FIGS. 29–32, the screen assembly 130 may have any of the structural features shown in FIGS. 1–28, including the molded end caps which seal the ends of the ridges.

In accordance with the present invention, the undersides 140 (FIGS. 31 and 32) of the troughs 139 are bonded in the above-described manner to the tops of the elongated aligned plate members 134, rather than being bonded to a plate in the manner shown in FIGS. 4, 21, 22 and 23A wherein the undersides of the troughs are bonded to the plate in a random manner, wherein the undersides of the troughs are bonded to the horizontal plate members 20 (FIG. 4) and are only bonded to the horizontal plate members where they may randomly contact them, but they are not purposely bonded along the aligned spaced vertical plate members 134 which extend transversely to plate edges 136 and 138, as shown in FIGS. 29–32. It will be appreciated that the undersides of the troughs can be secured to the spaced plate members in any suitable manner, in addition to the above-described preferred mode of securement by bonding.

Figure 29:
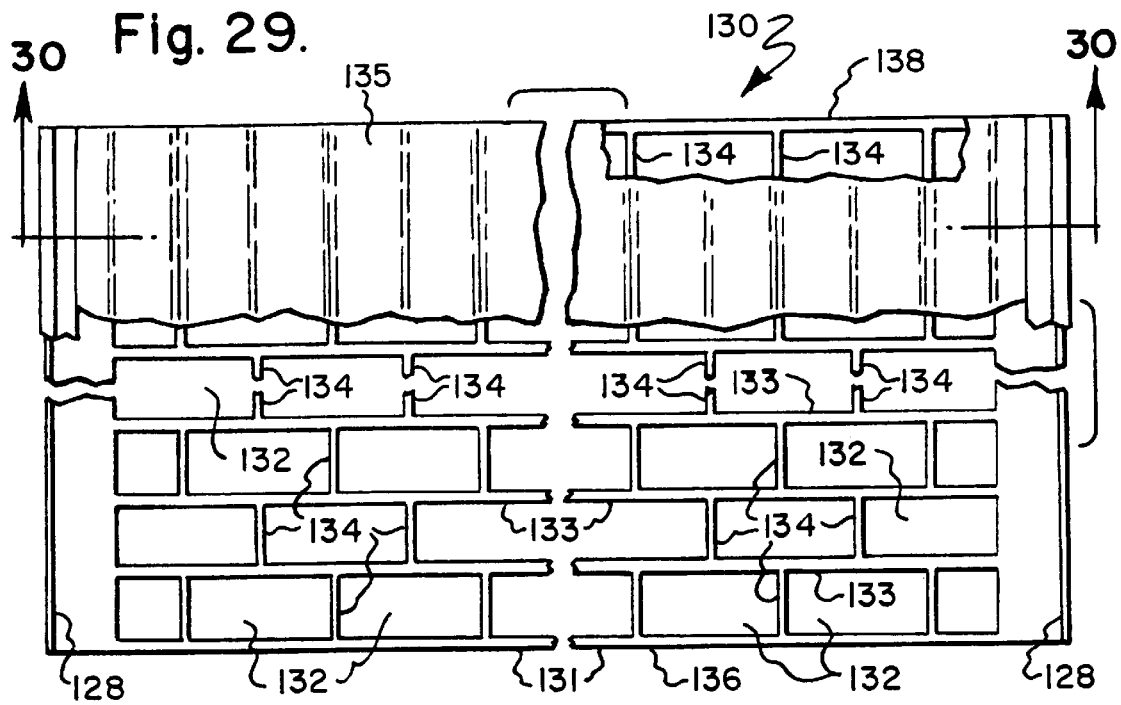
FIG. 29 is a fragmentary plan view of one embodiment of the present invention wherein the undersides of the troughs of an undulating screen are bonded to aligned spaced plate members of a plate.
Figure 30:
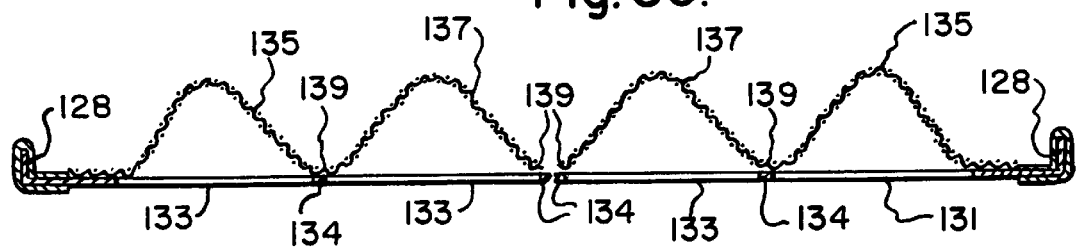
FIG. 30 is a fragmentary cross sectional view taken substantially along line 30—30 of FIG. 29.
Figure 31:
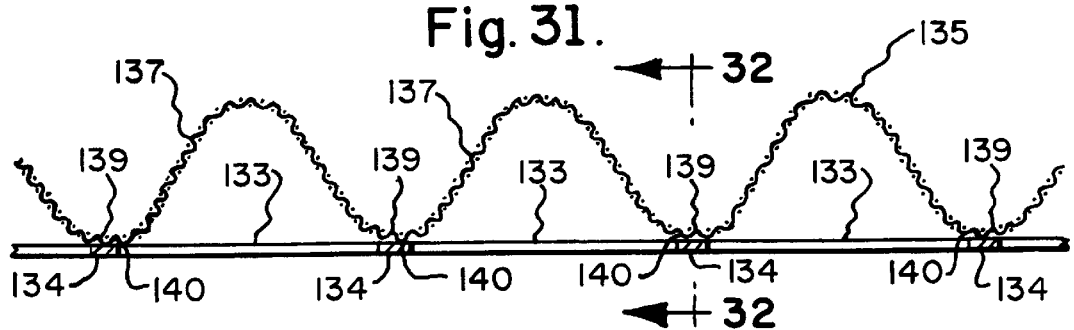
FIG. 31 is an enlarged fragmentary view of a portion of FIG. 30.
Figure 32:
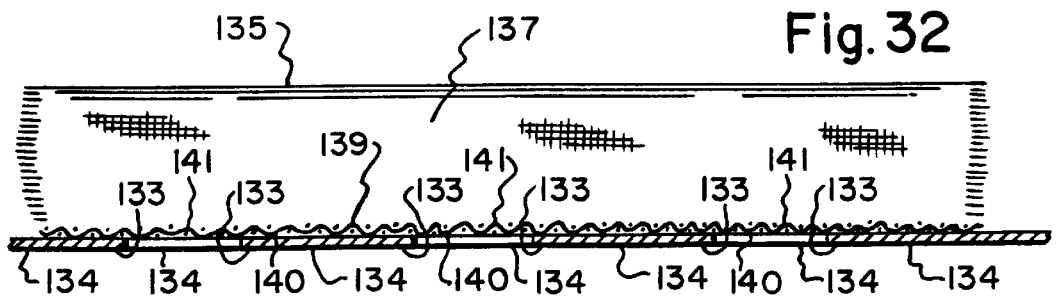
FIG. 32 is a fragmentary cross sectional view taken substantially along line 32—32 of FIG. 31.
Figure 33:
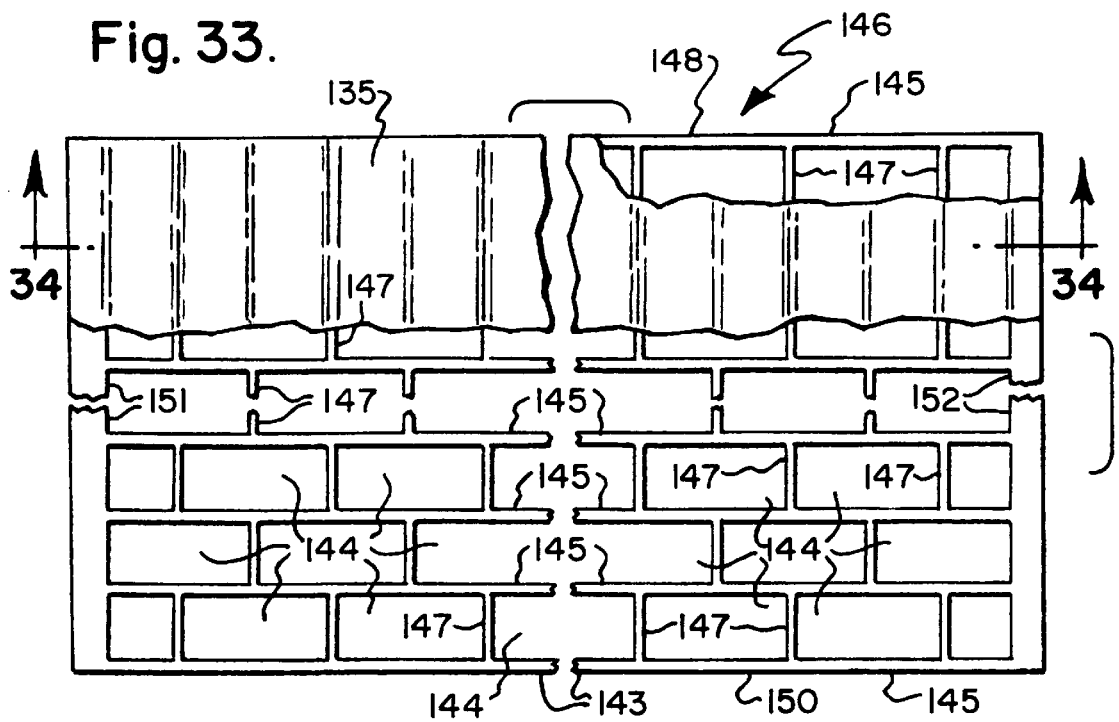
FIG. 33 is a fragmentary plan view of another embodiment of the present invention wherein the undersides of the troughs of an undulating screen are bonded to aligned spaced frame members of a frame.
Figure 34:
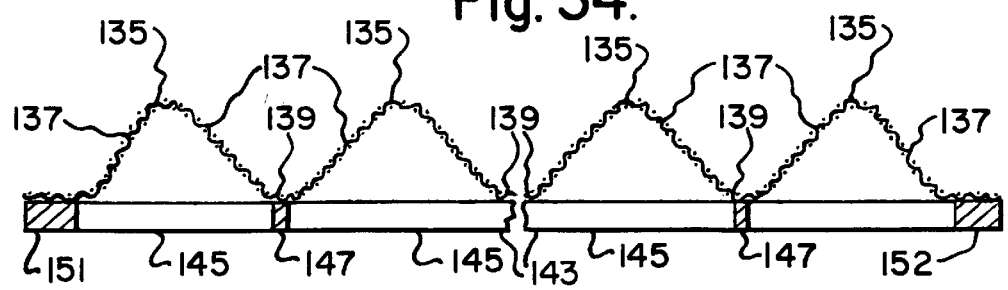
FIG. 34 is a fragmentary cross sectional view taken substantially along line 34—34 of FIG. 33.
Figure 35:
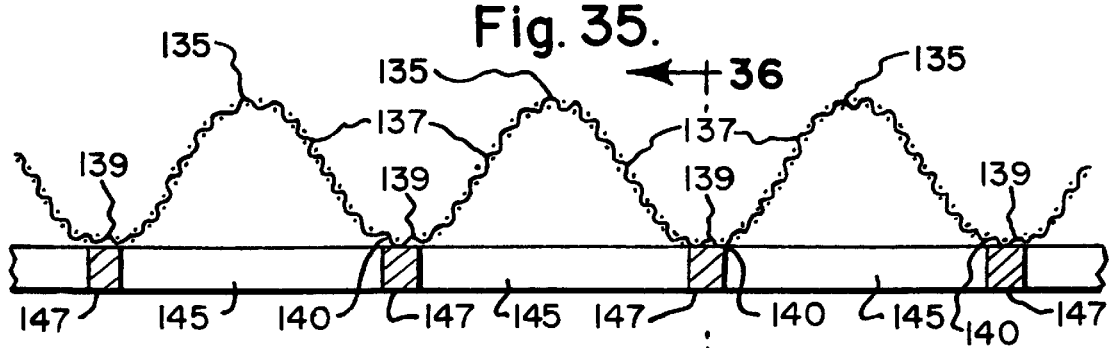
FIG. 35 is an enlarged fragmentary view of a portion of FIG. 34.
Figure 36:
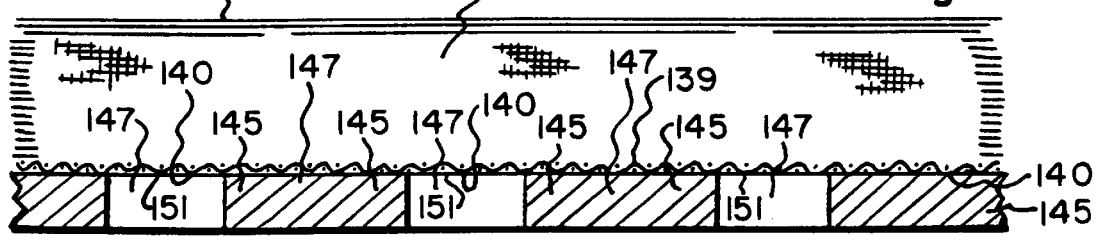
FIG. 36 is a fragmentary cross sectional view taken substantially along line 36—36 of FIG. 35.

As can be readily appreciated, by having the undersides 140 of the troughs 139 located precisely above spaced aligned elongated plate members 134 and bonded thereto, more bonding area is positively obtained than if the screen was mounted in a random manner wherein the undersides of the troughs were not necessarily bonded to the aligned plate members, such as 134. Furthermore, the fact that the aligned plate members 134 are spaced from each other in each row, as shown in FIG. 29, produces unbonded portions 141 of the troughs 139 (FIG. 32) between the aligned plate members 134 of each row so that material can pass downwardly through the unbonded portions 141 between the aligned plate members 134. While a specific configuration of a plate is shown in FIGS. 29–32, it will be appreciated that other plate configurations having spaced aligned plate members are within the scope of the present invention.

In FIGS. 33–36 another embodiment of the present invention is disclosed wherein the undulating screen 135 may be identical in all respects to that described above. The only difference is that the screen 135 is mounted on a frame 143 rather than a plate 131, such as shown in FIGS. 29–32. More specifically, the frame 143 can have the same general pattern as plate 131, namely, with apertures 144 defined by horizontal frame members 145 and elongated vertical frame members 147 which are oriented in parallel rows and in spaced relationship to each other within the rows. The frame 143 may be made out of solid bars or hollow rods or I-beams or channels or any other suitable type of structural shape. In addition, while not shown, the side edges 151 and 152 may be mounted on a vibratory screening machine in any suitable manner known in the art.

As described above relative to FIGS. 29–32, the undersides 140 of troughs 139 are secured by bonding to aligned spaced frame members 147, which extend transversely between frame edges 148 and 150, so as to obtain the maximum area of bonding with frame 143.

Also there are spaced unbonded portions 151 (FIG. 36) in between portions of each trough 139 which are bonded to elongated frame members 147 to permit material to pass through such spaced portions 151 from the bottoms of the troughs.

It will be appreciated that the securing of the screen to the frame may be in any suitable manner in addition to the above-described form of securement by bonding. Also, while the configuration of the frame 143 is pictorially similar to plate 131, it is to be noted that it is portrayed as being thicker in FIGS. 34–37 which correspond to FIGS. 30–32 of the plate, to thereby represent a frame.

It can thus be seen that the improved screen assemblies 130 and 146 are manifestly capable of achieving the above-enumerated objects, and while preferred embodiments of the present invention have been disclosed, it will be appreciated that it is not limited thereto but may be otherwise embodied within the scope of the following claims.

I claim:

1. A screen assembly for screening material in a vibratory screening machine, said assembly comprising a frame having opposite edges, a plurality of apertures in said frame, elongated frame members oriented in substantially parallel rows extending transversely to said opposite edges and located on opposite sides of said plurality of apertures, a screen formed in an undulating shape with elongated substantially parallel ridges, troughs formed between said ridges for conducting material which travels longitudinally of said troughs while it is being screened, and undersides on said troughs, said undersides of said troughs extending transversely to said opposite edges and being longitudinally aligned with and secured to said elongated frame members on the opposite sides of a plurality of said apertures.

2. A screen assembly as set forth in claim 1 wherein said frame members comprise tubular members, respectively.

3. A screen assembly as set forth in claim 1 wherein said frame members comprise rods.

4. A screen assembly for screening material in a vibratory screening machine, said assembly comprising a plate having opposite edges, a plurality of apertures in said plate, elongated plate members oriented in substantially parallel rows extending transversely to said opposite edges and located on opposite sides of said plurality of apertures, a screen formed in an undulating shape with elongated substantially parallel ridges, troughs formed between said ridges for conducting material which travels longitudinally of said troughs while it is being screened, and undersides on said troughs, said undersides of said troughs extending transversely to said opposite edges and being longitudinally aligned with and secured to said elongated plate members on the opposite sides of a plurality of said apertures.

5. A plurality of screen assemblies for mounting on a vibratory screening machine for screening material, each assembly comprising a plate having opposite edges, a plurality of apertures in said plate, elongated plate members oriented in substantially parallel rows and extending transversely to said opposite edges and located on opposite sides of said plurality of apertures, a screen formed in an undulating shape with elongated substantially parallel ridges, troughs formed between said ridges of each of said screen assemblies for conducting material longitudinally of said troughs while it is being screened, and undersides on said troughs, said undersides of said troughs extending transversely to said opposite edges and being longitudinally aligned with and secured to said elongated plate members on the opposite sides of a plurality of said apertures, each screen assembly being mounted adjacent to another screen assembly with said ridges and troughs of adjacent assemblies being in alignment so that material which is being screened can pass longitudinally through the aligned troughs of said adjacent screen assemblies.

6. A plurality of screen assemblies as set forth in claim 5 wherein said elongated ridges have end portions which are sealed against entry of material which is being screened.

7. A plurality of screen assemblies for mounting on a vibratory screening machine for screening material, each assembly comprising a frame having opposite edges, a plurality of apertures in said frame, elongated frame members oriented in substantially parallel rows and extending transversely to said opposite edges and located on opposite sides of said plurality of apertures, a screen formed in an undulating shape with elongated substantially parallel ridges, troughs formed between said ridges of each of said screen assemblies for conducting material which is being screened longitudinally of said troughs while it is being screened, and undersides on said troughs, said undersides of said troughs extending transversely to said opposite edges and being aligned with and secured to said elongated frame members on the opposite sides of a plurality of said apertures with said ridges overlying said plurality of apertures, each assembly being mounted adjacent to another screen assembly with said ridges and troughs of adjacent assemblies being in alignment so that material which is being screened can pass longitudinally through the aligned troughs of said adjacent screen assemblies.

8. A plurality of screen assemblies as set forth in claim 7 wherein said elongated ridges have end portions which are sealed against entry of material which is being screened.

9. A screen assembly as set forth in claim 1 wherein said elongated frame members of each row are longitudinally spaced from each other.

10. A screen assembly as set forth in claim 9 wherein said elongated frame members of each row are aligned with each other.

11. A screen assembly as set forth in claim 4 wherein said elongated plate members of each row are longitudinally spaced from each other.

12. A screen assembly as set forth in claim 11 wherein said elongated plate members of each row are aligned with each other.

13. A plurality of screen assemblies as set forth in claim 5 wherein said elongated plate members of each row are longitudinally spaced from each other.

14. A plurality of screen assemblies as set forth in claim 13 wherein said elongated plate members of each row are aligned with each other.

15. A plurality of screen assemblies as set forth in claim 7 wherein said elongated frame members of each row are longitudinally spaced from each other.

16. A plurality of screen assemblies as set forth in claim 15 wherein said elongated frame members of each row are aligned with each other.

* * * * *